March 21, 1933.  R. A. FORESMAN  1,902,359
FURNACE
Filed Dec. 30, 1930     2 Sheets-Sheet 1
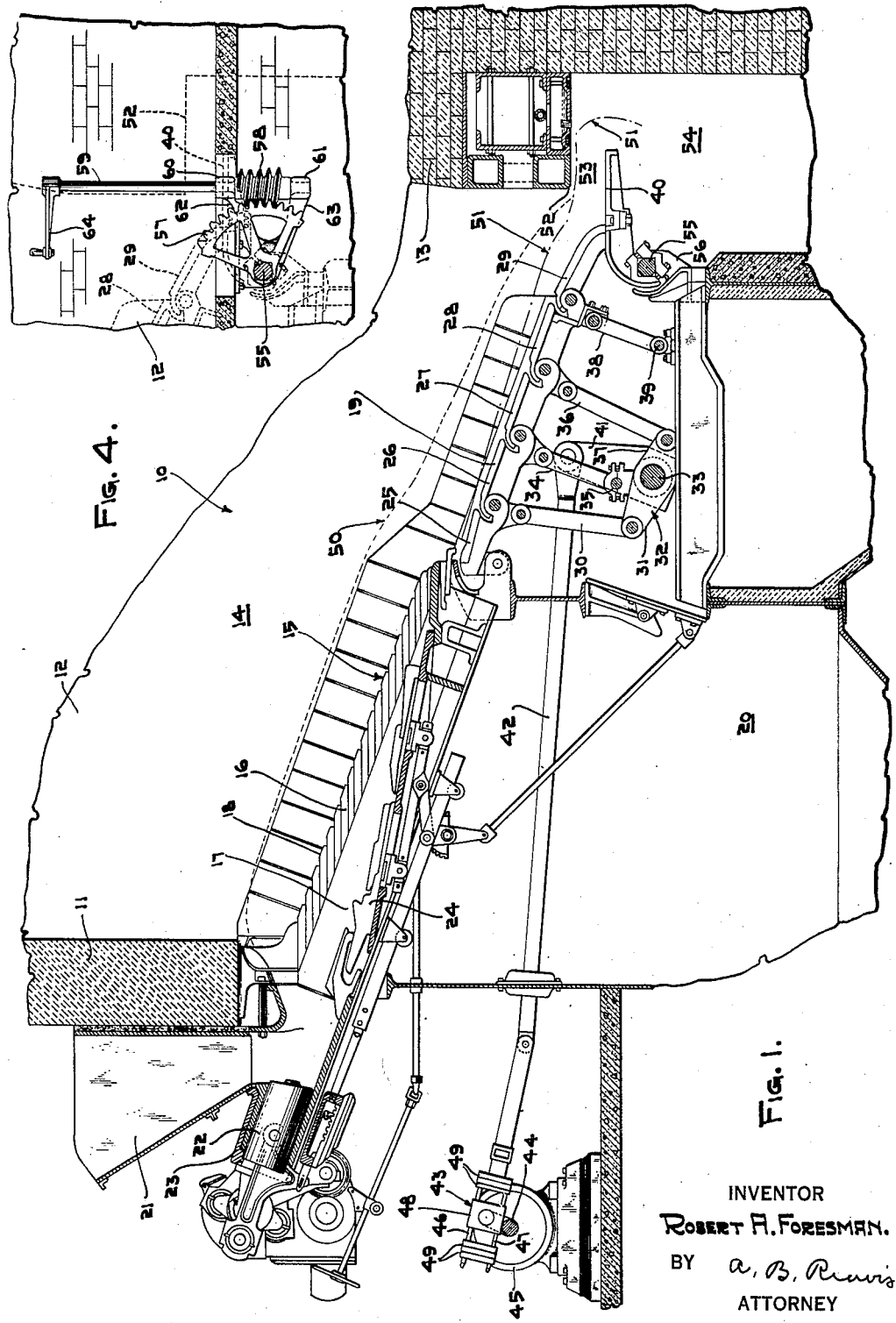
INVENTOR
ROBERT A. FORESMAN.
BY
ATTORNEY

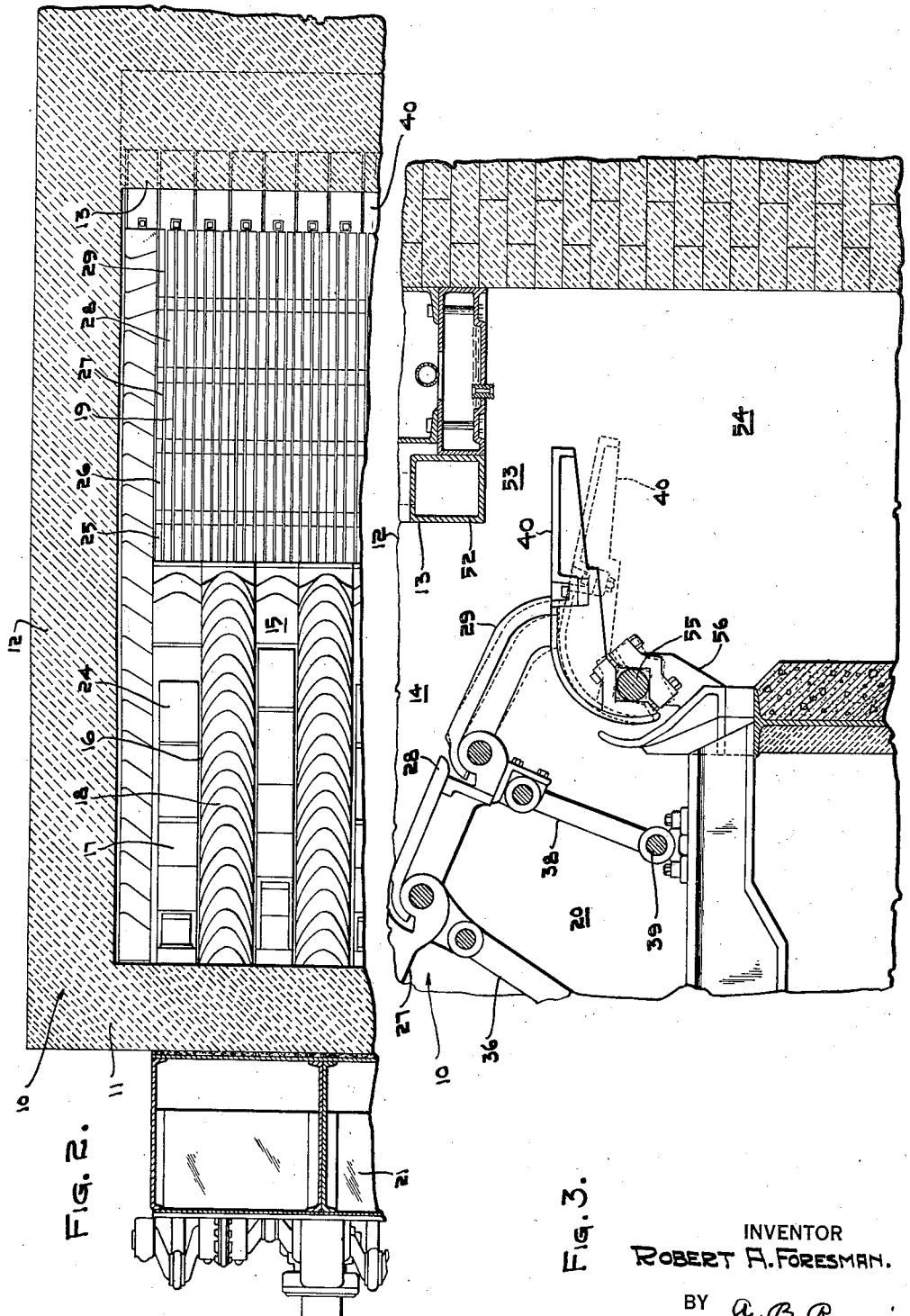

Patented Mar. 21, 1933

1,902,359

UNITED STATES PATENT OFFICE

ROBERT A. FORESMAN, OF MOORES, PENNSYLVANIA, ASSIGNOR TO WESTINGHOUSE ELECTRIC & MANUFACTURING COMPANY, A CORPORATION OF PENNSYLVANIA

FURNACE

Application filed December 30, 1930. Serial No. 505,615.

My invention relates to furnaces and more particularly to progressive feed stokers and means for disposing of the ash from the discharge ends of such stokers, and it has for a broad object to improve the efficiency of this type of apparatus.

Apparatus for disposing of the refuse from progressive feed stokers heretofore known to me, may be classified as belonging to one of two general types; the first type being what is commonly referred to as the dump grate, and the second type being the clinker grinder pit with rolls disposed in the lower portion thereof for grinding out the ash.

In the dump grate type, there is usually provided a pivoted dump grate at the discharge end of the stoker which is operated periodically to dump the refuse resting thereon. This type of apparatus is inefficient in operation for the reason that, no matter how well the stoker is operated, a substantial percentage of combustible remains in the material over the dump grate, and when the dumping operation is effected the combustible passes out of the furnace with the ash. Furthermore, after a dumping operation, the dump grates are bare and excess air flows therethrough and into the furnace until the grates are again covered by the fuel bed, thereby lowering the efficiency of the furnace during this period. Another undesirable feature of a dump grate stoker is that it is necessary for the ash to accumulate at the lower end between dumping periods, and such accumulation provides an increasing resistance to the downward movement of the fuel bed which results in the accumulation of ash and the formation of troublesome clinkers in the fuel bed. However, due to the low cost and simplicity of construction of the dump grate, it is used generally with the smaller stokers.

The clinker grinder pit provides for the continuous removal of ash having a low combustible content and this is effected without infiltration of excess air. Furthermore, due to the continuous removal of the ash from the lower end of the stoker, the fuel bed is permitted to move downwardly with a minimum of resistance. However, the clinker pit is more expensive to construct and maintain, and consequently its use is limited practically to the larger sizes of stokers.

It is therefore a more specific object of this invention to provide an inexpensive, effective, and efficient apparatus for continuously discharging ash from stokers without infiltration of excess air.

These and other objects are effected by my invention, as will be apparent from the following description and claims taken in connection with the accompanying drawings forming a part of this application, in which:

Fig. 1 is a longitudinal sectional view through the stoker apparatus constructed in accordance with the present invention;

Fig. 2 is a fragmentary view of the apparatus shown in Fig. 1;

Fig. 3 is an enlarged view showing the lower or discharge end of the apparatus shown in Fig. 1; and, Fig. 4 is a fragmentary elevational view showing the outside of the furnace and the means for adjusting the rate of discharge of ash from the furnace.

According to a detail aspect of the present invention, I provide a progressive feed stoker including an overfeed grate section at the discharge end thereof. The overfeed grate section comprises a plurality of grate members pivotally connected together in end-to-end relation and extending in the direction of fuel feed. Means is provided for supporting and moving the grate section so that the grate members move both in the direction of fuel feed and angularly about axes extending transversely of the fuel feed. A normally stationary member is disposed transversely of the overfeed grate at the discharge end thereof and provides a support for the ash ejected by the grate. A furnace wall is provided at the rear of the aforementioned member and has an overhanging portion which forms, in conjunction with the rear portions of the ash-supporting member, a passage through which the ash is discharged from the furnace. The ash-supporting member is supported for movement about a fixed axis at its forward end, and means is provided for moving such member about its axis of support so as to change the size of the passage. Means is also provided for adjusting the amount of motion imparted to the overfeed grate section, and this latter means, in conjunction with the angular adjustment of the ash-supporting member, provides for the regulation of the rate of discharge of ash from the furnace.

Referring now in detail to the construction illustrated, the reference numeral 10 indicates a furnace in its entirety. The furnace comprises a front wall 11, side walls 12 and a rear or bridge wall 13. The furnace walls define a combustion chamber 14. A stoker 15 is disposed within the lower portion of the combustion chamber and comprises an underfeed section 16 of alternately-arranged retorts 17 and tuyère rows 18, and an overfeed section 19 including a series of grate members pivotally connected together in end-to-end relation and extending in the direction of fuel feed. An air chamber 20 is provided beneath the stoker and serves to supply air for supporting combustion.

In operation, fuel is fed from a hopper 21 into the ends of the retorts 17 by means of primary rams 22 reciprocating within a ram box 23, and the fuel is advanced along the retorts and forced upwardly over and onto the tuyère rows 18 by means of secondary rams 24 reciprocating within the retorts. As the fuel moves over the end of the underfeed section, it is received by the overfeed section and due to the action of the latter, is thoroughly agitated and positively moved thereover toward the final point of discharge.

The overfeed section comprises a series of grate members 25, 26, 27, 28, and 29. The first grate member is supported for movement about a fixed axis at its forward end by a suitable stationary part of the stoker structure. The rear end of the first grate member is pivotally connected to the upper end of a driving link 30, the lower end of the latter being pivotally connected to the outer end of one arm 31 of a lever 32 which is keyed to an oscillating power shaft 33. The rear end of the second grate member 26 is pivotally connected to the upper end of a supporting link 34, which latter is pivotally supported at its lower end by a rod 35 mounted in suitable supporting bearings. The rear end of the third grate member 27 is pivotally connected to the upper end of a second driving link 36, and the latter link is pivotally connected to the outer end of a second arm 37 of the lever 32. The grate member 28 is pivotally supported at its rear end by means of a second supporting link 38 which is supported at its lower end by a rod 39 carried by suitable bearings. The rear end of the last grate member 29 slides upon the upper surface of the forward portion of an ash-supporting member 40, which latter is normally stationary.

The power shaft 33 is adapted to be operated by any suitable means which may be adjusted to vary the amplitude of oscillations of the shaft. As shown, a lever arm 41 is fixed to the shaft 33 and is pivotally connected at its outer end to the end of a connecting rod 42. The connecting rod 42 extends outside of the furnace and is connected by an adjustable lost motion connection 43 to a crank 44 of a suitable source of power, for example, a motor-driven reduction unit 45.

The lost-motion connection 43 consists in a pair of guide rods 46 and 47 carried by the end of the rod 42 and a block 48 connected to the pin of the crank 44 and slidable on the rods 46 and 47 and engaging blocks or abutments 49 carried by the rods 46 and 47. Motion is transmitted from the crank 44 to the connecting rod 42 by engagement of the sliding block 48 with the blocks 49. The amount of motion transmitted may be varied by removing one or more of the blocks 49, or by adding more blocks.

As the power shaft oscillates, the driving links 30 and 36 move alternately up and down and move the grate members angularly about their pivotal connections. Such movement results in the bodily movement of the grate members 26, 27, 28, and 29. The angular and bodily movements of the grate members provide for the positive breaking up of the fuel bed, the positive progression of the fuel bed thereover and for the positive ejection of the ash from the lower end of the grate section.

The positive movement imparted to the fuel bed by the overfeed grate section, results in lowering the resistance offered to the movement of the fuel bed upon and from the underfeed section, and the agitation of the fuel bed by the grate levels off the bed, thereby making the resistance that is offered uniform across the end of the underfeed section and causing the fuel bed to move downwardly on the underfeed section in an even and uniform manner. The breaking up of the fuel bed also results in reducing the size of any clinker which might have formed, and in permitting the thorough penetration of air thereby burning out practically all of the combustible content of the fuel.

As the ash forms in the fuel bed, it gravitates to the lower portions thereof and finally comes to rest on the stoker structure. As the bed moves toward the final point of discharge, the layer of ash on the stoker structure becomes thicker. Hence, adjacent the last grate member 29 and the ash support 40, the layer of ash is quite thick.

In Fig. 1 of the drawings, a dash line 50 indicates the approximate thickness of the fuel bed, and the dot and dash line 51 indicates the thickness of the ash. It is to be observed that I have shown the dot and dash or ash line 51 as beginning at the upper end of the overfeed grate section. This is due to the fact that the sectional view is taken through a retort. On the underfeed section, the ash forming over the retorts is mixed with the fuel bed and is prevented from moving downward into the retort due to the positive upward movement imparted to the coal by the rams. Most of the ash forming over the retorts comes to rest on the tuyère rows due to the movement of the coal in that direction. A section through a tuyère row would indicate the ash line as extending from the rear to the front of the furnace, and being inclined toward the plane of the stoker with the meeting point at the upper end. The ash on the tuyère rows is carried down the stoker by virtue of its frictional contact with the downwardly moving fuel bed.

It is to be noted, that there is a difference at the upper end of the overfeed grate between the thickness of the bed of ash opposite the ends of the tuyère rows and the thickness of the bed opposite the ends of the retort. However, the breaking-up action of the overfeed grate results in reducing the ash bed to a substantially uniform thickness across the width of the stoker by the time the bed reaches a point over the rear end of the overfeed grate.

The rear or bridge wall 13 is provided with an overhanging portion 52 which forms the upper side of a discharge passage 53 for the ash. The rear portion of the ash-supporting member 40 forms the lower side of the passage 53. The last grate member 29 operates to positively move the ash across the ash support and through the passage 53 and into an ash pit 54.

The amount of ash discharged for any given period of time may be regulated by varying the amount of motion imparted to the overfeed grate 19, this being done by adding or removing blocks 49 in the lost-motion driving connection 43 in the manner previously explained.

The amount of ash discharged for a unit of time may be also regulated by adjusting the ash support 40 with respect to the overhanging portion 52 of the bridge wall so as to vary the size of the passage 53. As shown, the forward end of the ash support is carried by a shaft 55 supported in fixed brackets 56. The shaft 55 extends exteriorly of the furnace wall as indicated in Fig. 4. A sector worm-wheel 57 is keyed to the outer end of the shaft 55 and meshes with a worm 58 mounted on an operating shaft 59. The shaft 59 is carried by bearings 60 and 61 formed at the outer ends of supporting brackets 62 and 63, respectively. A hand crank 64 is fixed to the outer end of the shaft 59. By turning the hand crank, the angular position of the ash support may be varied, thereby varying the size of the passage 53 and regulating the amount of ash discharge.

It is desired that the upper level of the ash in the passage 53 be maintained just below the projecting portion 52 so that such ash will move through the passage freely and the minimum amount of air be permitted to enter the furnace from the ash bed. As stated, I have indicated in Fig. 1, the desired thickness of the ash bed by the dot and dash line 51.

In order to maintain the desired thickness of the ash in the passage 53, the amount of ash discharged through such passage during a given period of time must vary with the amount of ash formed on the stoker, and this latter can be effectively done by varying the amount of motion imparted to the overfeed grate and the angular position of the ash support 40.

The amount of ash formed on the stoker for a given period of time is, of course, dependent upon the rate at which the fuel is burned, and the ash content of the coal, as fired. Usually, the same grade of coal is burned on any particular stoker. Therefore, for a particular stoker the ash content of the coal remains practically the same. The combustion rate of a stoker is determined by the amount of motion imparted to the fuel feeding elements, the latter including the overfeed grate. Therefore, for coal with the same ash content and with the proper size of passage 53, the element 29 will operate to feed the ash out through the passage 53 at the proper rate to maintain the desired ash level in the passage, and such will be the case over the ordinary range of operation. The adjustment provided for the support 40 is, in general, only needed to establish the proper relationship between the size of the passage 53 and the motion of the overfeed grate for the particular grade of coal being burned. It is to be noted, however, that should the combustion rate be raised to a point beyond the normal capacity of the stoker, which happens at times during peak loads, when efficiency is not as important as the amount of heat released, the refuse will contain more combustible and consequently be greater in bulk, and it will be necessary to increase the size of the passage 53 in order to effectively rid the stoker of the refuse.

Due to the particular construction and operation of the overfeed grate and to the adjustable driving mechanism for the grate, the continuous discharge of ash with a minimum combustible content, may be effectively carried out. Furthermore, due to the fact that the last grate member of the series is pivotally supported at its forward end and is slidably supported by the ash support at its lower end, such grate will operate effectively with the ash support at any adjusted position. The regulatable motion of the overfeed grate section provides for the breaking up of the fuel bed to the proper degree so as to thoroughly burn out the combustible with minimum forming of clinkers, for the positive progression of the fuel and ash thereover, and lastly for the positive ejection of the ash from the furnace. The adjustable ash support provides for the proper rate of ash discharge for any grade of coal, and when necessary, provides for the continuous operation of the stoker at exceptionally high ratings.

From the above description and accompanying drawings, it will be readily seen that I have provided an improved means for discharging the ash from furnaces, which means has all the desirable operating features of the prior clinker pits, and at the same time, costs even less to manufacture, install, and maintain than the prior dump grate constructions.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a furnace, the combination of a progressive feed stoker including a grate disposed at the discharge end thereof and mounted for movement bodily in the direction of fuel feed for ejecting the ash therefrom; means for effecting such movement of the grate; a normally stationary member disposed transversely of the fuel feed at the discharge end of the stoker and providing a support for the ash coming from the stoker; the forward end of the member extending beneath and forming a bearing support for the rear end of the grate; a furnace wall disposed transversely of said member at the rear thereof and having a portion overhanging the rear portion of the member to form, in conjunction with said member, an approximately horizontally extending passage through which ash is moved by virtue of the action of the grate; adjusting means for moving the ash supporting member angularly about an axis extending transversely of the fuel feed and disposed adjacent the forward end of the member, whereby the rear portions of the member may be moved up or down with respect to the overhanging portion to vary the size of the passage.

2. In a furnace, the combination of a progressive feed stoker including a grate disposed at the discharge end thereof and mounted for movement bodily in the direction of fuel feed for ejecting the ash therefrom; means for effecting such movement of the grate; a normally stationary member disposed transversely of the fuel feed at the discharge end of the stoker and providing a support for the ash coming from the stoker; the forward end of the member extending beneath and forming a bearing support for the rear end of the grate; a furnace wall disposed transversely of said member at the rear thereof and having a portion overhanging the rear portion of the member to form, in conjunction with said member, an approximately horizontally extending passage through which ash is moved by virtue of the action of the grate; and means for regulating the rate of ash disposal from the furnace comprising means for varying the amount of motion imparted to the grate, and adjusting means for moving the ash supporting member angularly about an axis extending transversely of the fuel feed and disposed adjacent the forward end of the member, whereby the rear portions of the member may be moved up or down with respect to the overhanging portion to vary the size of the passage.

3. In a furnace, the combination of a progressive feed stoker including a grate disposed at the discharge end thereof and mounted for movement bodily in the direction of fuel feed for ejecting the ash therefrom; the grate being also mounted for pivotal movement about an axis adjacent its forward end and extending transversely of the fuel feed; means for effecting such movement of the grate; a normally stationary member disposed transversely of the fuel feed at the discharge end of the stoker and providing a support for the ash coming from the stoker; the forward end of the member extending beneath and forming a bearing support for the rear end of the grate; a furnace wall disposed transversely of said member at the rear thereof and having a portion overhanging the rear portion of the member to form, in conjunction with said member, an approximately horizontally extending passage through which ash is moved by virtue of the action of the grate; adjusting means for moving the ash supporting member angularly about an axis extending transversely of the fuel feed and disposed adjacent the forward end of the member, whereby the rear portions of the member may be moved up or down with respect to the overhanging portion to vary the size of the passage.

4. In a furnace, the combination of a progressive feed stoker including a series of grate members arranged at the discharge end thereof and pivotally connected together in end-to-end relation and extending in the direction of fuel feed; some of the grate members including the last grate member of the series being supported both for bodily movement in the direction of fuel feed and also for angular movement about axis extending transversely or the fuel feed; means for effecting such movements of the grate members; a normally stationary member disposed transversely of the fuel feed at the discharge end of the stoker and providing a support for the ash coming from the stoker; the forward end of the member extending beneath and forming a bearing support for the rear end of the last grate member of the series; a furnace wall disposed transversely of the rear of said member and having a portion overhanging the rear portion of the member to form, in conjunction with said member, an approximately horizontally extending passage through which ash is moved by virtue of the movement of the last grate member; and means for adjusting the position of the member relative to the overhanging portion of the wall so as to change the size of the passage and thereby regulate the rate of discharge of ash from the furnace.

5. In a furnace, the combination of a progressive feed stoker including a series of grate members arranged at the discharge end thereof and pivotally connected together in end-to-end relation and extending in the direction of fuel feed; some of the grate members including the last grate member of the series being supported both for bodily movement in the direction of fuel feed and also for angular movement about axis extending transversely of the fuel feed; means for effecting such movements of the grate members; a normally stationary member disposed transversely of the fuel feed at the discharge end of the stoker and providing a support for the ash coming from the stoker; the forward end of the member extending beneath and forming a bearing support for the rear end of the last grate member; a furnace wall disposed transversely of the rear of said member and having a portion overhanging the rear portion of the member to form, in conjunction with said member, an approximately horizontally extending passage through which ash is moved by virtue of the movement of the last grate member; and means for regulating the rate of ash discharge from the furnace comprising means for varying the amount of motion imparted to the series of grate members and adjusting means for moving the ash supporting member about an axis extending transversely of the fuel feed and disposed adjacent the forward end of the member, whereby the rear portion of the support may be moved up or down with respect to the overhanging portions to vary the size of the passage.

In testimony whereof, I have hereunto subscribed by name this 30th day of December, 1930.

ROBERT A. FORESMAN.